United States Patent

Greenwood et al.

[11] Patent Number: 6,124,894
[45] Date of Patent: Sep. 26, 2000

[54] AUDIO SIGNAL PROCESSOR

[75] Inventors: Jonathan Mark Greenwood; Michael John Ludgate, both of Basingstoke, United Kingdom

[73] Assignees: Sony Corporation, Tokyo, Japan; Sony United Kingdom Limited, Weybridge, United Kingdom

[21] Appl. No.: 08/827,526

[22] Filed: Mar. 28, 1997

[30] Foreign Application Priority Data

Apr. 2, 1996 [GB] United Kingdom ............... 9606923

[51] Int. Cl.[7] .................... H04N 7/00; H04N 7/084; H04N 7/087
[52] U.S. Cl. .................... 348/484; 348/485; 348/512; 348/513
[58] Field of Search ............... 348/484, 485, 348/482, 480, 481, 483, 512, 513, 423; H04N 7/00, 7/084, 7/087

[56] References Cited

U.S. PATENT DOCUMENTS

| | | | |
|---|---|---|---|
| 4,851,909 | 7/1989 | Noske et al. | 348/513 |
| 4,953,168 | 8/1990 | Odaka | 348/513 |
| 5,043,830 | 8/1991 | Chiba Nobuhiro | 348/513 |
| 5,351,092 | 9/1994 | Poimboeuf et al. | 348/512 |
| 5,483,538 | 1/1996 | Rainbolt | 348/513 |
| 5,504,522 | 4/1996 | Setogawa | 348/563 |
| 5,877,815 | 3/1999 | Tsujimura | 348/513 |

*Primary Examiner*—Nathan Flynn
*Assistant Examiner*—Vivek Srivastava
*Attorney, Agent, or Firm*—Frommer Lawrence & Haug, LLP.; William S. Frommer

[57] ABSTRACT

NTSC signals have a frame rate of 29.97 frames per second. In SDI, audio data is sampled at a rate 30n where n is an integer, e.g. 48K samples per second. Thus there are 1601.6 samples per frame. Although there are an integer number 8008 samples per five frame sequence, two frames have 1601 samples and 3 frames have 1602 samples. This creates a variable storage requirements from frame to frame and causes problems in editing. The SDI audio data is separated from associated video and decimated by a factor h, where h=4 for example in a signal processor 2, 3, 4, 5 and 6. The decimated data is written into a FIFO circuit at the rate 30n/h synchronously with frame timing under the control of a frame reference generator 10, 9. A fixed integer number n/h of samples is written into the FIFO 7 in each frame under the control of a write control circuit 8. n/h=400 for example, where n=1600 and h=4. Any additional sample in each frame is dropped. The 400 sample frames are stored on a disc 14. If it is desired to reproduce the samples, they are written into a FIFO 12. A read control circuit 13 reads the samples out synchronously with the video frame rate. In three frames 400 samples are read out: in two frames 401 samples are read out.

12 Claims, 5 Drawing Sheets

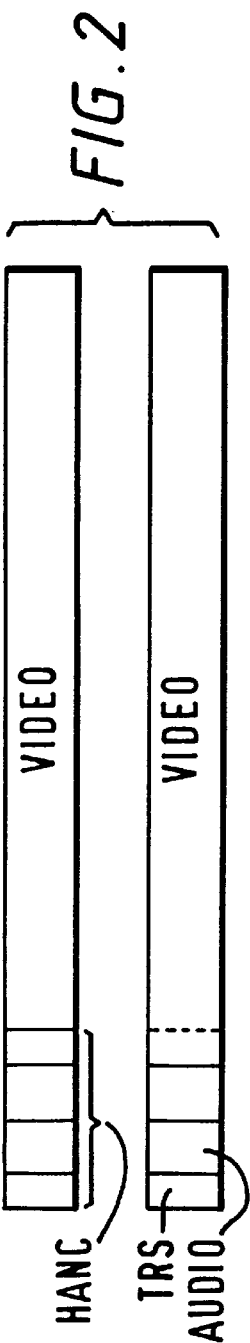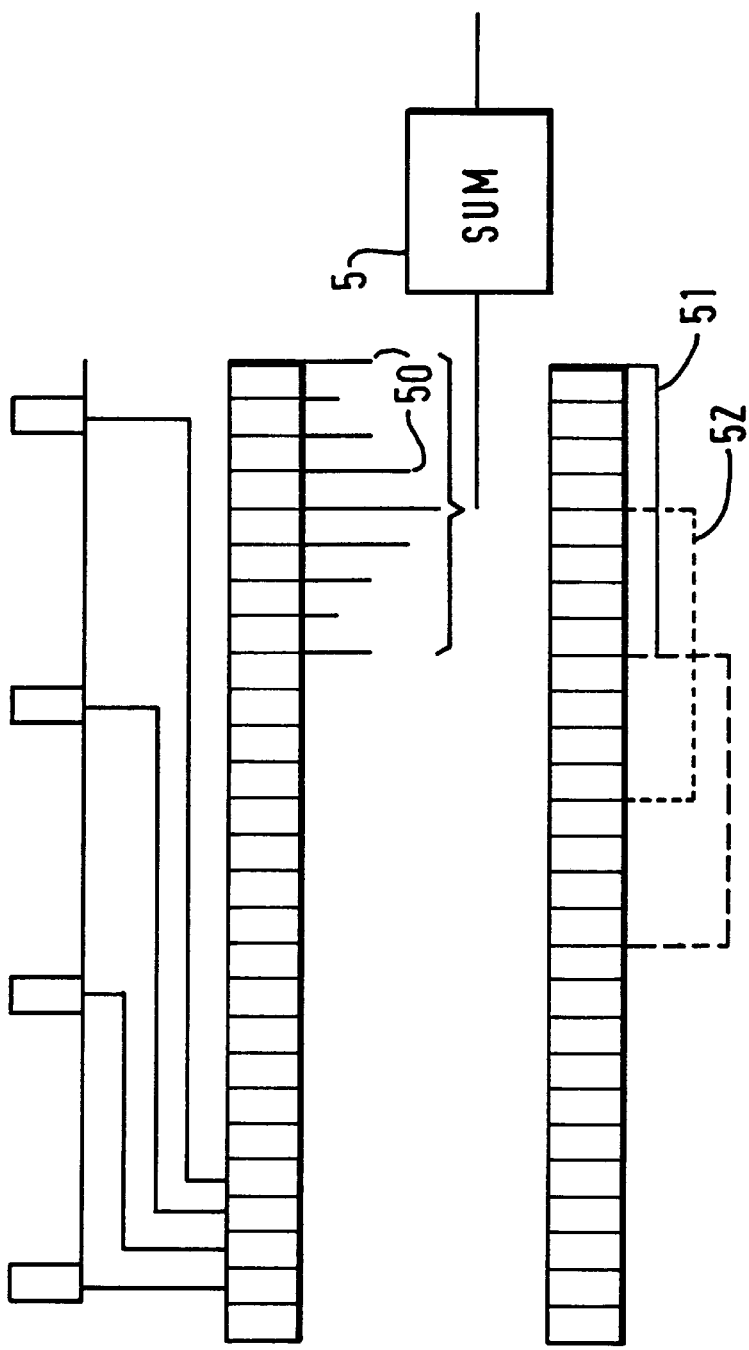
FIG. 2
FIG. 3(A)
FIG. 3(B)
FIG. 3(C)

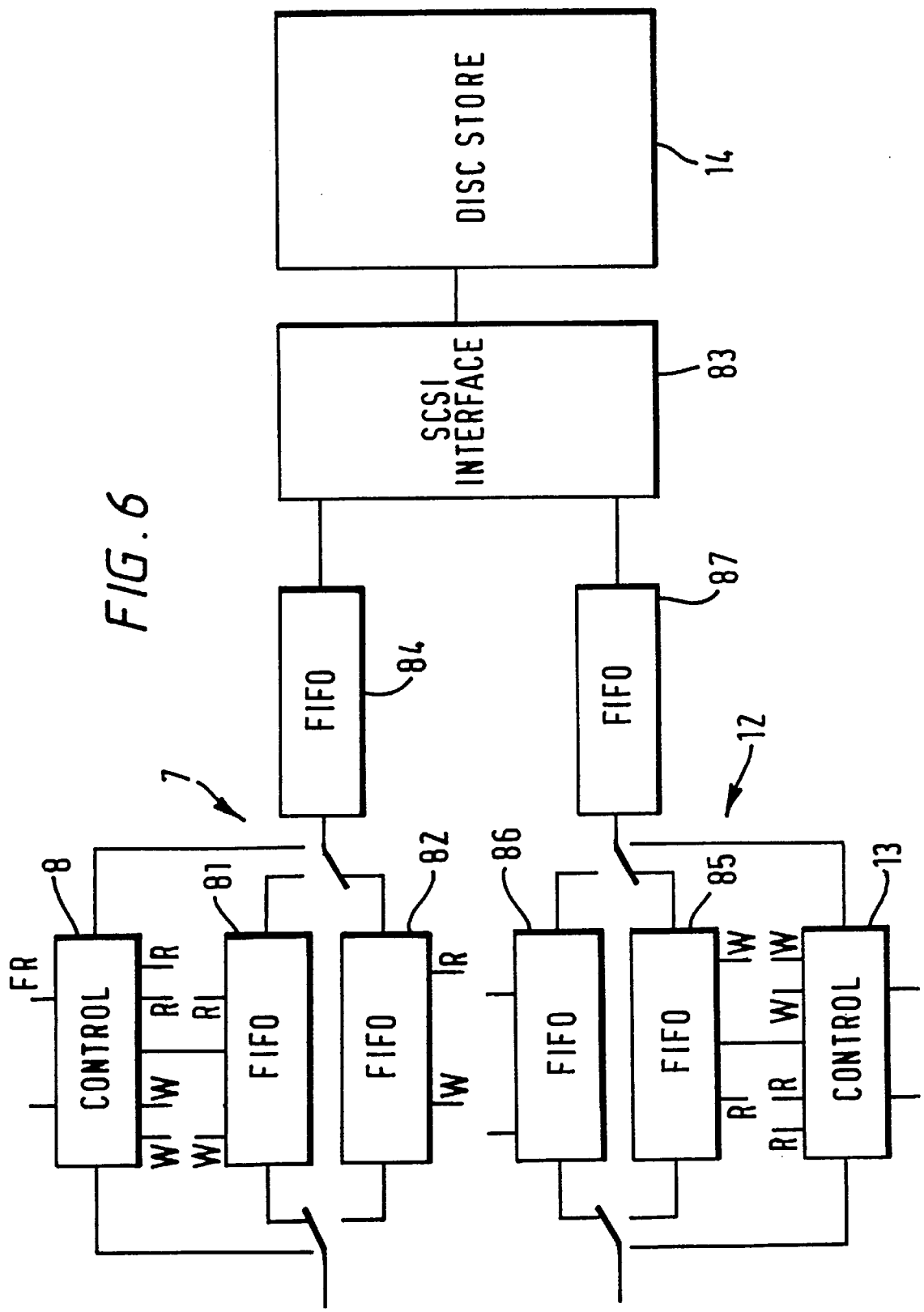

AUDIO SIGNAL PROCESSOR

BACKGROUND OF THE INVENTION

1. Field of the Invention

The present invention relates to an audio signal processor.

2. Description of the Prior Art

It is known to associate audio data samples with video data. This is done, in the SDI standard (Serial Digital Interconnect) defined by SMPTE. The SDI audio standard is defined by SMPTE: see SMPTE 272M: "Formatting AES/EBU Audio and Auxiliary Data into Digital Video Ancillary Data Space"- SMPTE Journal, April 1994. In SDI digital audio data is embedded in digital video data.

NTSC signals have a rate of 59.94 fields per second, 29.97 frames per second. In for example SDI the audio data is sampled at 48 KHz per channel, with the sample clock locked to the television signal. This results is a non-integer number of audio samples per frame:

$$48000/29.97 = 1601.6$$

to one decimal place.

There is however an integer number 8008 of samples per 5 frame sequence. However with the 5 frame sequence there are 1602 samples in 3 frames and 1601 samples in 2 frames. This causes difficulties for storing and editing. It is necessary to identify the individual audio frames in each sequence. Variable size storage is required. If a sequence is edited, in four out of five cases, the sequence will be broken requiring samples to be added or subtracted from the resulting edited sequence to restore the sequence to its correct numbers of samples in each frame of the sequence.

SUMMARY OF THE INVENTION

According to one aspect of the invention, there is provided apparatus for processing audio data samples associated with video data having a frame rate of 29.97 frames per second, the audio data samples having a sample rate of 30n samples per second where n is an integer, the apparatus comprising means for decimating the samples by a factor h, where h is an integer, and n is much greater than h, means for storing the decimated audio data samples, means for writing the decimated audio data samples into the store synchronously with the video frames and means for reading the decimated audio data samples out of the store, and control means for controlling the writing or reading such that the number of samples written to or read from the store for each video frame is n/h.

According to another aspect of the invention, there is provided apparatus for processing audio data samples associated with frames of video data the video data having a frame rate of 29.97 frames per second, the audio data having a sampling rate of 30n/h per second per channel of audio where n and have integers and n is much greater than h and comprises n/h samples per video frame where h is an integer the apparatus comprising

- means for storing audio data
- means for writing the audio data into the storing means for each video frame, and
- means for repeatedly reading the n/h audio data samples of associated with a video frame from the storing means at the rate 30n/h samples per second for the duration of the video frame.

Thus in accordance with said one aspect of the invention, audio samples to be for example stored on a storage disc, are stored with equal numbers of samples for each video frame. Where for example n=1600 and h=4 and the original number of samples for a frame exceeds e.g. 400 the additional sample is dropped.

In accordance with the said another aspect of the invention, where for example n=1600 and h=4, reading the store at the rate 30n/h for the duration of each 29.97 Hz video frame results in 400 samples read from 3 frames and 401 samples for 2 frames in a five frame sequence.

BRIEF DESCRIPTION OF THE DRAWINGS

The above, and other objects, features and advantages of this invention will be apparent from the following detailed description of illustrative embodiments which is to be read in connection with the accompanying drawings.

FIG. 2 is a schematic timing diagram showing the general form of lines of SDI data;

FIGS. 3, A, B and C are schematic timing diagrams illustrating the operation of an audio data store and digital filter;

FIG. 6 is a schematic diagram of the apparatus of FIG. 1 for storing and reproducing audio data.

DESCRIPTION OF THE PREFERRED EMBODIMENTS

Figure 1:
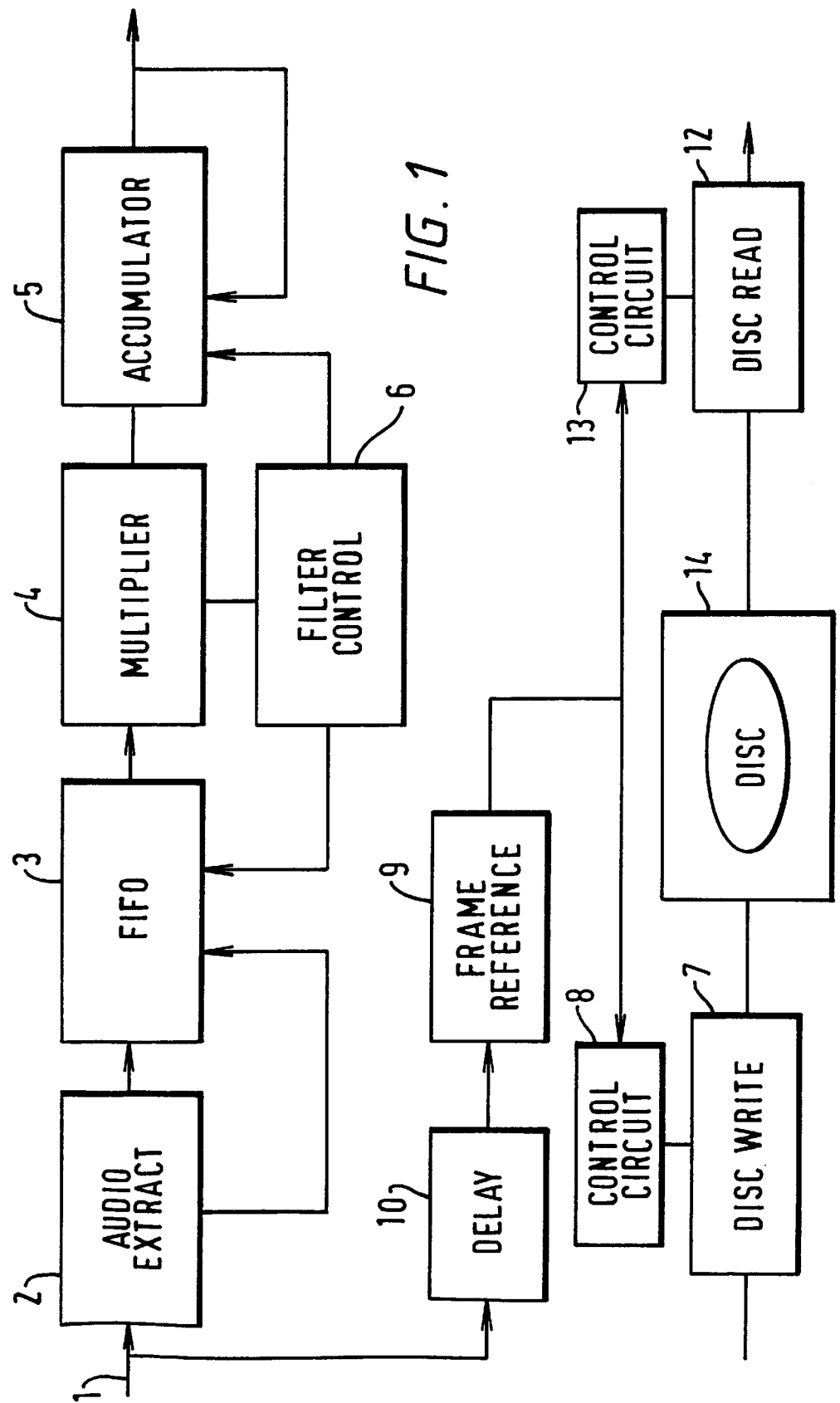
FIG. 1 is a block diagram of an audio signal processor in accordance with the invention; the processing including apparatus for storing the audio data produced.

Referring to FIGS. 1 and 2, the audio signal processor of FIG. 1 receives at input 1 SDI data having the general form shown in FIG. 2. The SDI data has a sample rate of for example 27 M sample/second and comprises Horizontal Ancillary Data (HANC) and Active Component 4:2:2 Video Data. The HANC is placed in the horizontal blanking interval of a television line. In SDI, digital audio data forms part of the HANC. The digital audio data comprises 2 pairs of channels of 20 bit audio data each sampled at 48 KHz with the sample clock locked to the television signal. In the case of NTSC signals having 525 lines per television frame and a frame rate of 29.97 frames/second each channel has 8008 audio samples per 5 frames. There is a non-integer number (1601.6) of samples per frame for each audio channel.

The HANC at the beginning of each video line comprises a preamble indicating that audio data is present, the number of bits of audio data and the audio data with accompanying channel ID's. The HANC also includes TRS words which provide a frame reference signal.

For ease of the following explanation, it is assumed that the audio data represents only one audio channel with a data sampling rate of 48 KHz.

The SDI audio data consists of bursts of audio data bits occurring at 27 M samples/sec. These bits are extracted by the Audio Extractor circuit 2 which also extracts a synchronisation signal associated with the audio data. The synchronisation signal is provided by the preamble. Under the control of the synchronisation signal, the audio data bits are written into a RAM 3 organised as a FIFO (First In First Out) store.

The audio data is written into the FIFO 3 at 27 M samples/sec at spaced time intervals as shown in FIG. 3A. In the FIFO the audio samples are written into successive addresses as shown in FIG. 3B. The addresses are selected by a write pointer which selects the addresses of the FIFO successively.

The samples are read out to a filtering and decimation circuit 4, 5, 6. The samples to be read out are selected by a read pointer which selects addresses successively.

A group of g serially adjacent samples are read out of the FIFO and fed serially to a coefficient multiplier 4. Each sample of the group is multiplied by a weighting coefficient 50 shown schematically in FIG. 3B. For simplicity of illustration, FIG. 3B shows the samples in the RAM or FIFO with the weights applied simultaneously. Although that can be done, in actual practice of the present embodiment of the invention, the samples are read out serially and weighted serially. Each weighted sample of a group is fed to an accumulator 5 to be summed with the sum of the previous weighted samples in the group. The coefficients are produced by a filter control circuit 6 which also controls the read clock of the FIFO 3 and the accumulator 5. The control circuit resets the accumulator every g additions; i.e. after each group of g samples has been weighted and summed.

In one 48 KHz cycle period g multiplications and summations occur.

On the next 48 KHz cycle period another group 52 of g samples is serially readout of the FIFO. As shown in FIG. 3C this next group of g samples is displaced by h samples from the previous group. In this way decimation by a factor h is achieved: h is for example 4.

After decimation by the factor, h=4 if the single channel of audio samples are associated with NTSC video having 525 lines per frame at a frame rate of 29.97 frames per second, there are 2002 samples in 5 audio frames, resulting in 400.4 filtered samples per frame for one audio channel at a reduced sample rate of 12 KHz.

This results in a five frame sequence having 3 frames of 400 samples and 2 frames of 401 samples. This causes difficulties in storing data in a data store such as a Magneto-Optical disc because variable frame sizes have to be provided. In addition it would be necessary to identify the frames of each 5 frame sequence. Furthermore, if a sequence is edited, there are 4 cases out of five where the 5 frame sequence would be broken. To restore the sequence after an edit which breaks the sequence, samples would have to be added or dropped from the remaining audio frames.

Referring to FIG. 1, in the apparatus shown, the weighted audio samples are supplied to a write circuit 7. The write circuit is controlled by a control circuit 8 so that the samples are written into the circuit 7 synchronously with a video frame reference signal generated by a frame reference circuit 9. The circuit 9 is arranged to produce frame reference signals at the NTSC frame rate of about 29.97 per second in the absence of external synchronisation. External synchronisation is derived from the SDI at input 1 via a delay line 10 which compensates for the audio signal processing delay through the circuits 2, 3, 4 and 5. Because of the delay 10, the frames of samples produced by accumulator 5 occur synchronously with the frame reference signal. The samples are written into sequential addresses of the FIFO selected by a write pointer.

The control circuit 8 counts 400 samples from the occurrence of the frame reference signal and allows only these 400 samples to be written into the circuit 7 at the reduced sample rate of 12 KHz. If a 401st sample occurs in a frame, the control circuit 8 inhibits the write control associated with this sample 401st. The N frames of 400 audio samples are read out of the write circuit 7 time compressed. The time compressed audio samples are stored on a disc recorder via an SCSI interface. Time compression is used so the audio data rate matches the SCSI transfer rate and the data rate of other data which may be recorded on the disc.

To reproduce the audio samples from the disc the samples are read from the disc recorder by a read circuit 12 controlled by a control circuit 13. The control circuit 13 receives the frame reference signals from the frame reference signal generator 9. The frame reference signals occur at approximately the frame rate of 29.97 per second. The time compressed N frames of 400 audio samples are written into the read circuit from the disc and time expanded. The control circuit 13 causes a frame of 400 samples to be made available at the output of read circuit 12 at 12 KHz, synchronously with the frame reference signal. The result is that in some frames 400 samples are read out; in others 401 samples are read out, the additional sample being produced by reading the last sample in a frame twice.

Figure 4:
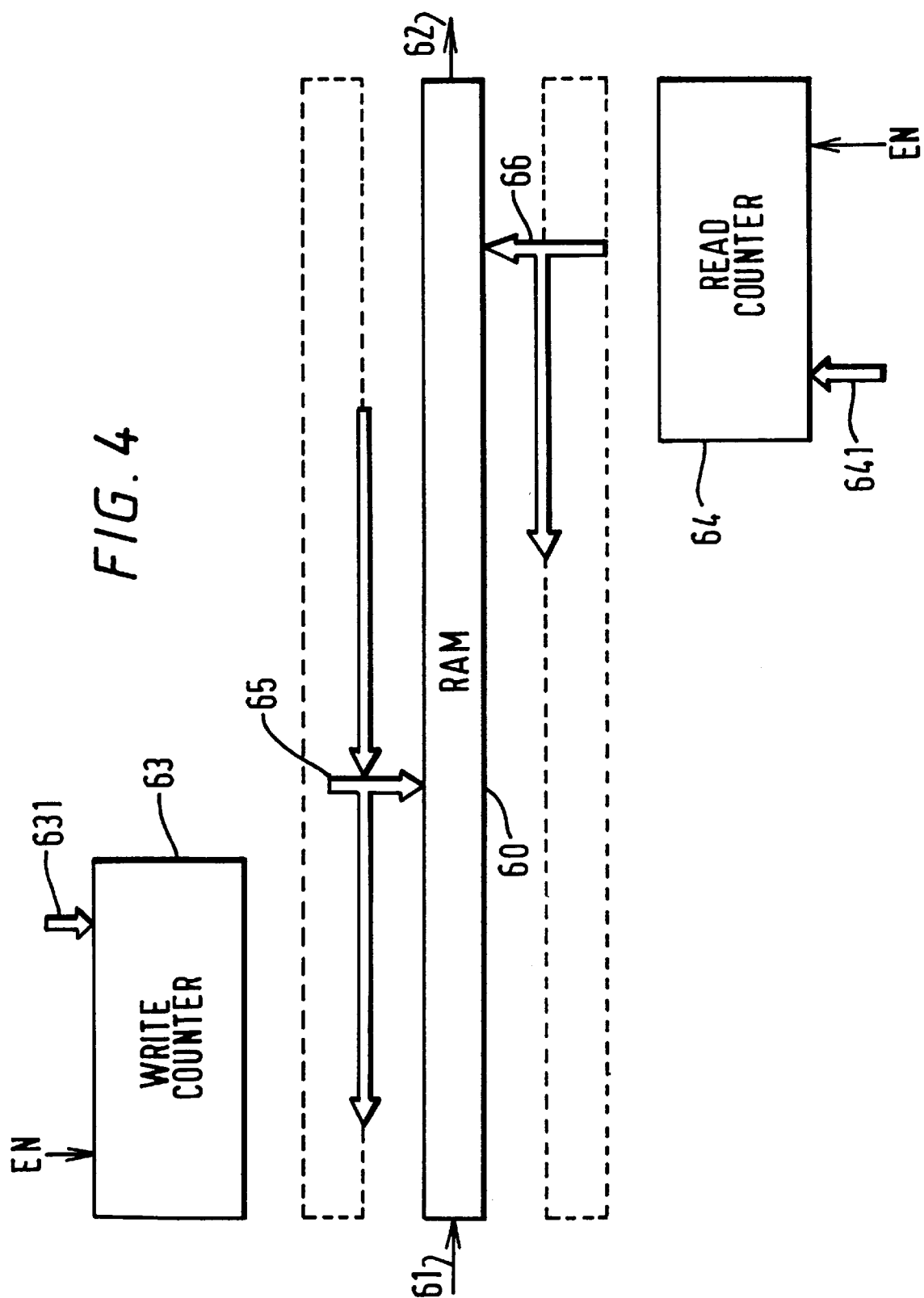
FIG. 4 is a schematic diagram illustrating the operation of a RAM organised as a FIFO as used in the processor of FIG. 1.

Referring to FIG. 4, a RAM organised as FIFO is shown to further explain the operation of the FIFOs 3, 7 and 12 in the processor of FIG. 1. The RAM 60 has a data input 61, a data output 62, a write counter 63 and a read counter 64. The write counter sequentially produces write addresses at which successive data samples at the input 61 are stored. Likewise the read counter sequentially produces read addresses to read the data samples stored at the addresses. The write and read counters successively address all the addresses as indicated by the write arrow 65 representing a write pointer and the read arrow 66 representing a read pointer.

In the case of the FIFO 3 in the processor of FIG. 1, the count of the write counter 63 is increased upon the occurrence of each audio sample under the control of the audio extract circuit 2, the sync signal of the audio extract circuit being applied to input 631 of the counter 63. The count of the read counter 64 is increased each time the filter control circuit 6 requires a new sample to be available, the filter control circuit applying a request signal to input 641 of counter 64.

Referring to FIG. 6, the write circuit comprises two FIFO circuits 81 and 82 controlled by a control circuit 8 each having 400 storage cells. One channel of 400 audio samples per frame are delivered to the FIFO circuits 81 and 82. In known manner, as one frame of samples is being written into one of the FIFO circuits (e.g. 81) at 12 KHz, the preceding frame of samples is read out of the other FIFO circuit (82). On the next frame, the roles of the FIFO circuits are reversed. In this embodiment the frame of audio samples is read out at 1.6875 MHz and is thus time compressed.

The control circuit 8 operates to write only 400 samples per frame into the FIFO circuits 81 and 82. Thus one sample is dropped from those frames having 401samples.

The time compressed samples read out of the FIFO circuits 81 and 82 are delivered to a SCSI interface 83 by another FIFO 84 acting as a buffer store to allow the rate of production of data by the FIFO circuits 81 and 82 to match the data transfer rate of the SCSI interface the data rate of other data recorded on the disc.

The read circuit 12 has the same construction as the write circuit 7. Time compressed audio samples are reproduced from the disc store and delivered to FIFO circuits 85 and 86 via the SCSI interface 83 and a FIFO buffer 87. Under the control of control circuit 13 the time compressed audio samples of one frame are written into one (e.g. 86) of the FIFO circuits whilst the previous frame of audio samples are read out decompressed at 12 KHz. On the next frame the roles of the FIFO circuits are reversed.

The control circuit 13 causes 400 samples per frame to be made available at the output of the read circuit once the 400th sample is available at the output, it remains there until the next write cycle. Thus in those frame intervals where there are 401 audio samples, the 400th sample is available to be read twice by the circuit which uses the samples.

Figure 5A:
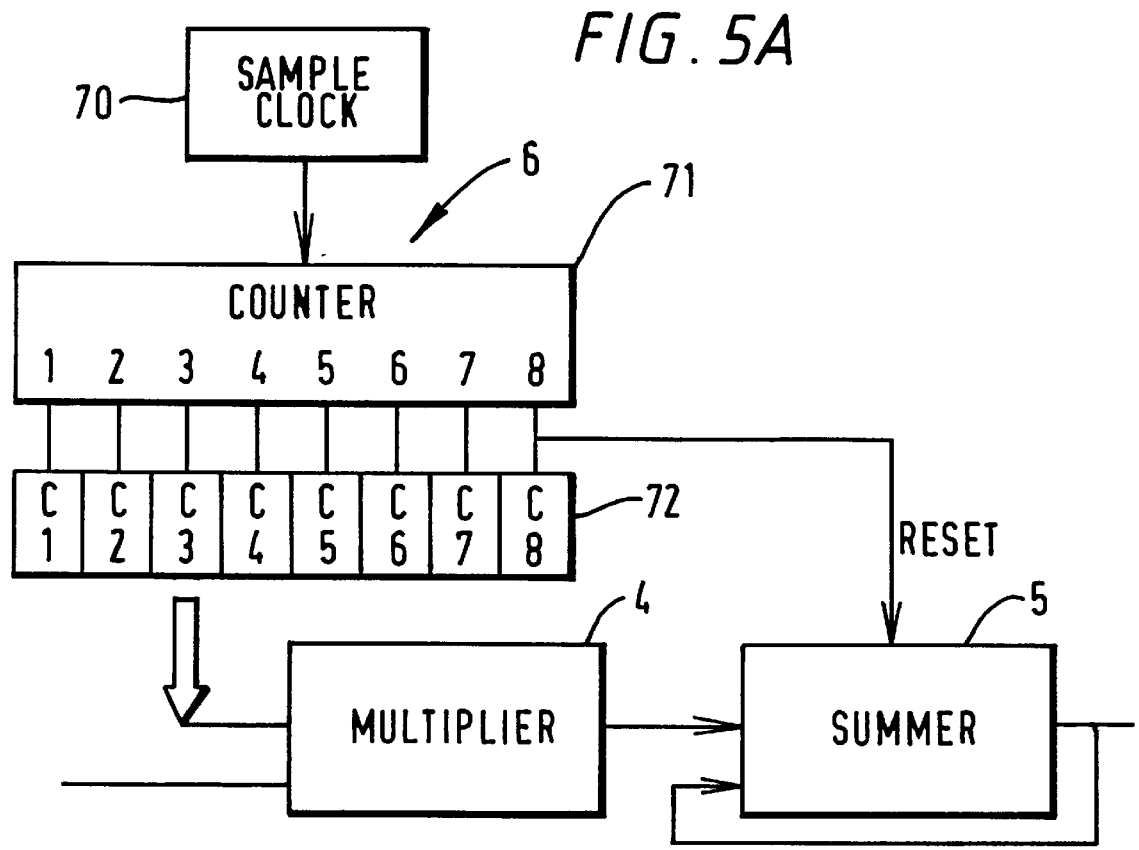
FIGS. 5A and B are schematic diagram of the filter control, multiplier and accumulator of the processor of FIG. 1.

Referring to FIGS. 5 and 3, the audio samples have a sample rate of 12K samples/second. Groups of g samples are weighted and summed serially in one period of 48KHz. In FIG. 5 it is assumed for ease of illustration g=8.

A sample clock 70 operating at g×48 KHz provides clock pulses which are counted by a modulo-8 counter 71. The counter 71 sequentially selects 8 coefficients stored in a RAM 72. The read counter 64 of the FIFO 3 is incremented by each clock pulse to read successive samples which are multiplexed in the multiplier 4 by the weighting coefficients. The summer 5 sequentially sums each weighted coefficient from the multiplier 4 with the current sum in the summer. After g samples have been weighted the summer is reset in response to the count g=8 of the counter.

Once the g samples have been weighted and added the read pointer is moved to read another group of g samples displaced by e.g. h=4 samples from the beginning of the previous group.

Figure 5B:
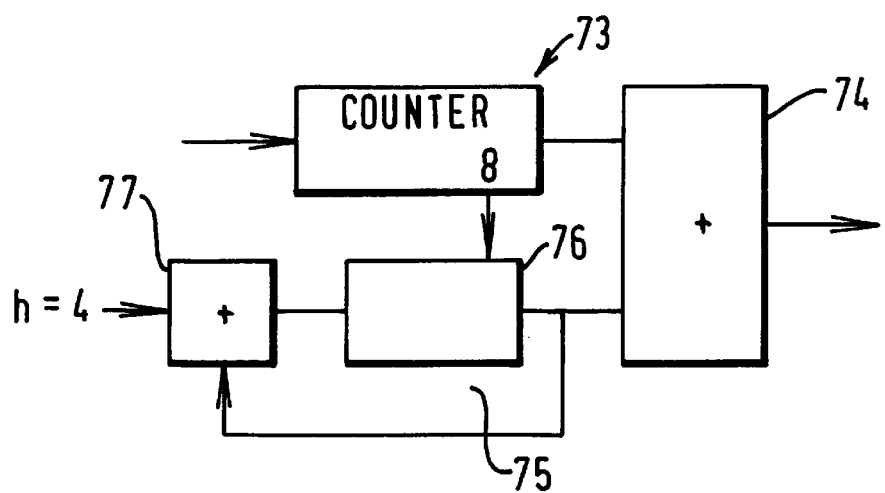

As shown in FIG. 5B, for this purpose the filter control 6 includes a read address generator for generating the read addresses for FIFO 3. The generator comprises the modulo-8 counter 71, an adder 74 and an accumulator 75 comprising a store 76 and an adder 77 which receives at one input a set count of h=4. The counter 71 counts the sample clock pulses from the clock 70. The accumulator store 76 initially contains a count of 0. The adder 74 produces the count of the counter 71 plus the count in store 76. When the counter of counter 71 reaches g=8, the store 76 is enabled to received the sum of its contents plus 4 from the adder 77. (It will be recalled that the contents of summer 5 also are reset when the count of counter 71 reaches g=8.) Thus a sequence of g=8 samples are read from the FIFO 3 and weighted and summed. When the count g=8 occurs the count in the store 76 increases to 4. A new sequence of g=8 samples are then read from the FIFO 3 beginning with address 4. At the next count of g=8, the count in the store 76 increases to 8. In this way each group of g samples is successively displaced from its preceding group.

Although it has been assumed for ease of illustration g=8, in practice g and the magnitudes of the weighting coefficients are determined in known manner by the desired filter characteristic: g may be 31 for example, defining a symmetrical FIR filter characteristic.

For ease of explanation and illustration it has been assumed that there is only one channel of audio. There may be more than one channel of audio, for example 2 or 4 channels. In that case, the channels are sample-multiplexed. The sample clock 70 is then increased in frequency by the number of channels and one set of weighting coefficients is provided for each channel.

The 4 channels of audio samples are delivered to the disc write circuit at 48 KHz and time compressed to a sample rate of 6.75 MHz.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing audio data samples associated with video data having a frame rate of 29.97 frames per second, the audio data samples having a sample rate of 30n samples per second per channel of audio, where n is an integer, the apparatus comprising means for decimating the samples by a factor h where h is an integer and n is much greater than h, means for storing the decimated audio data samples, means for writing the decimated audio data samples into the store synchronously with the video frames and means for reading the audio data samples out of the store, and control means for controlling the writing or reading such that the number of samples written to or read from the store for each video frame is n/h per channel.

2. Apparatus according claim 1 wherein n is 1600.

3. Apparatus according to claim 1 wherein h=4.

4. Apparatus according to claim 1, wherein there are 4 channels of audio.

5. Apparatus according to claim 1, wherein the control means controls the writing of the audio data samples to the storing means such that only n/h samples per channel are written into the store for each frame.

6. Apparatus according to claim 5, wherein the reading means reads each frame of audio data samples out of the store at a rate much greater than n/h per channel per frame to time compress the audio data samples.

7. Apparatus according to claim 6, wherein the data rate of the time compressed samples is 1.6875 MHz per channel, for n=1600, and h=4.

8. Apparatus according to claim 1, further comprising a storage device coupled to the said store via an SCSI interface.

9. Apparatus for processing audio data samples associated with frames of video data, the video data having a frame rate of 29.97 frames per second, the audio data having a sampling rate of 30n/h samples per second where n and h are integers, n is much greater than h and comprises n/h samples per video frame, the apparatus comprising means for storing audio data, means for writing the audio data into the storing means for each video frame, and means for repeatedly reading the n/h audio data samples associated with a video frame from the storing means at the rate 30 n/h for the duration of the video frame.

10. Apparatus according to claim 9, wherein the audio data is time compressed, and comprising means for time expanding the audio data to the sampling rate 30n/h samples per second per audio channel.

11. Apparatus according to claim 10, wherein n=1600.

12. Apparatus according to claim 11, wherein h=4.

* * * * *